United States Patent
Thompson et al.

(10) Patent No.: US 9,646,292 B2
(45) Date of Patent: May 9, 2017

(54) METHOD AND SYSTEM FOR DISTRIBUTING DIGITAL MEDIA CONTENT

(75) Inventors: Doug Thompson, Hinsdale, IL (US); Donald Peterson, Westmont, IL (US); Steve Holstad, La Grange Park, IL (US); Terry Mainiero, Alrington Heights, IL (US)

(73) Assignee: FOLLETT CORPORATION, Westchester, IL (US)

( * ) Notice: Subject to any disclaimer, the term of this patent is extended or adjusted under 35 U.S.C. 154(b) by 43 days.

(21) Appl. No.: 13/560,605

(22) Filed: Jul. 27, 2012

(65) Prior Publication Data

US 2013/0054394 A1 Feb. 28, 2013

Related U.S. Application Data

(60) Provisional application No. 61/527,071, filed on Aug. 24, 2011.

(51) Int. Cl.
  *G06F 7/04* (2006.01)
  *G06F 21/00* (2013.01)
  *G06G 1/12* (2006.01)
  *G06Q 20/12* (2012.01)

(52) U.S. Cl.
  CPC ................. *G06Q 20/1235* (2013.01)

(58) Field of Classification Search
  USPC .......................................... 705/21
  See application file for complete search history.

(56) References Cited

U.S. PATENT DOCUMENTS

| | | | |
|---|---|---|---|
| 7,120,932 B2 | 10/2006 | Lockhart et al. | |
| 7,191,332 B1 * | 3/2007 | Pankajakshan | H04L 63/0428 713/160 |
| 7,680,808 B2 * | 3/2010 | Onoda | H04N 21/4334 707/999.102 |
| 7,716,245 B2 * | 5/2010 | Omae | G06F 21/10 707/787 |
| 7,865,405 B2 * | 1/2011 | Hendricks | G06Q 30/02 705/27.1 |
| 8,185,473 B2 * | 5/2012 | Ginter | G06F 21/00 705/52 |
| 8,286,228 B2 * | 10/2012 | Venters, III | G06F 21/10 380/255 |

(Continued)

FOREIGN PATENT DOCUMENTS

WO 0155256 A1 5/2011

*Primary Examiner* — Ashford S Hayles
(74) *Attorney, Agent, or Firm* — Leydig, Voit & Mayer, Ltd.

(57) ABSTRACT

A method and system for distributing digital content to customers at a plurality of points of transaction that allows each content provider to use its own method of digital rights management. A master digital catalog is used to load product data from a plurality of different content providers. The catalog contents are provided to retailers and other points of transaction. A digital activation broker processes customer orders from the points of transaction and provides information that allows the customer access to the content. The content may be provided by the digital activation broker or through a third-party website. In some embodiments, a payment processor is used to process payments submitted by the customers. The digital activation broker may also void transactions and look up lost authorization codes.

22 Claims, 8 Drawing Sheets

(56) References Cited

U.S. PATENT DOCUMENTS

| | | | |
|---|---|---|---|
| 2002/0125312 A1* | 9/2002 | Ogilvie | G06Q 20/02 235/380 |
| 2002/0152215 A1* | 10/2002 | Clark | G06F 21/10 |
| 2004/0039916 A1* | 2/2004 | Aldis | G06F 21/10 713/177 |
| 2004/0215570 A1* | 10/2004 | Uemura | G06Q 30/06 705/59 |
| 2004/0267880 A1 | 12/2004 | Patiejunas | |
| 2005/0049886 A1 | 3/2005 | Grannan | |
| 2005/0198493 A1* | 9/2005 | Bartas | H04W 4/001 713/154 |
| 2005/0256804 A1* | 11/2005 | Agapi | G06Q 30/00 705/52 |
| 2006/0015865 A1* | 1/2006 | Schneider | G06F 8/61 717/174 |
| 2006/0041748 A1* | 2/2006 | Lockhart | G06F 21/10 713/168 |
| 2006/0120522 A1* | 6/2006 | Clark | G06F 21/10 380/201 |
| 2006/0123025 A1* | 6/2006 | DeMello | G06F 21/10 |
| 2006/0271489 A1* | 11/2006 | Flanagan | G06Q 30/00 705/52 |
| 2007/0250911 A1* | 10/2007 | Nimon | G06F 21/10 726/4 |
| 2007/0288387 A1* | 12/2007 | Park | G06F 21/10 705/59 |
| 2008/0046374 A1* | 2/2008 | Rempe | G06Q 30/06 705/51 |
| 2008/0114836 A1* | 5/2008 | Zellner | G06Q 30/06 709/206 |
| 2008/0115197 A1* | 5/2008 | Moss | G06F 21/10 726/4 |
| 2008/0288343 A1* | 11/2008 | Ho | G06Q 30/02 705/14.52 |
| 2009/0187491 A1* | 7/2009 | Bull | G06Q 30/0601 705/26.1 |
| 2009/0199013 A1* | 8/2009 | Raciborski | H04L 63/0428 713/176 |
| 2009/0210698 A1* | 8/2009 | Candelore | G06Q 20/3829 713/153 |
| 2009/0293116 A1* | 11/2009 | DeMello | G06F 21/10 726/17 |
| 2010/0008500 A1* | 1/2010 | Lisanke | G06F 21/10 380/201 |
| 2010/0306083 A1* | 12/2010 | Oren | G06Q 30/04 705/26.25 |
| 2010/0306247 A1* | 12/2010 | Sidman | H04L 63/0428 707/769 |
| 2011/0007903 A1* | 1/2011 | Robert | G06F 21/10 380/279 |
| 2011/0035287 A1* | 2/2011 | Fox | G06Q 30/02 705/14.69 |
| 2011/0066844 A1* | 3/2011 | O'Toole, Jr. | G06F 21/10 713/153 |
| 2011/0238782 A1* | 9/2011 | Akadiri | G06Q 30/00 709/217 |
| 2011/0288910 A1* | 11/2011 | Garg | G06Q 30/0207 705/14.1 |
| 2012/0090032 A1* | 4/2012 | Trinklein | G06F 21/10 726/26 |
| 2012/0102329 A1* | 4/2012 | Mittal | G06F 21/10 713/176 |
| 2012/0150843 A1* | 6/2012 | Robert | G06F 21/6236 707/722 |
| 2012/0303491 A1* | 11/2012 | Hill | G06Q 30/06 705/27.2 |
| 2013/0024852 A1* | 1/2013 | Firman | G06F 8/60 717/170 |
| 2013/0054399 A1* | 2/2013 | Ben-Yaacov | G06Q 20/10 705/26.1 |
| 2013/0125223 A1* | 5/2013 | Sorotokin | H04L 9/3213 726/6 |
| 2013/0132733 A1* | 5/2013 | Agrawal | G06F 21/10 713/189 |

* cited by examiner

| Unique ID 211 | Title 212 | Author 213 | Publisher 214 | Image 215 | Price 216 | Content Provider 122 | Activation URL 217 | Fulfillment URL 218 | Computer Limit 219 | Encrypted Data 220 |
|---|---|---|---|---|---|---|---|---|---|---|
| 1936041111 | Frankenstein | Shelly | Simon & Brown | Frankenstein.jpg | $6.99 | Simon & Brown | Sbactivation.com | Sbfulfillment.com | 5 | Frankenstein.pdf |
| 0201483068 | Six Easy Pieces | Feynman | Helix Books | SEP.jpg | $19.95 | Audio Book Distributor | Abhouse.com | Helixfulfillment.com | 1 | |
| V573281445 | Flash of Genius | Abraham | Universal | FogCover.jpg | $9.95 | Universal | Universal.com | Videofulfillment.com | 2 | |

FIG. 2

METHOD AND SYSTEM FOR DISTRIBUTING DIGITAL MEDIA CONTENT

CROSS-REFERENCE TO RELATED APPLICATIONS

This application claims the benefit of U.S. Provisional Application No. 61/527,071, filed Aug. 24, 2011, for DIGITAL ACTIVATION HUB FOR MULTIPLE POINT-OF-TRANSACTION SYSTEMS AND MULTIPLE DIGITAL FULFILLMENT SYSTEMS, which is fully incorporated herein by reference.

TECHNICAL FIELD

This application relates to distributing digital media content subject to digital rights management protections.

BRIEF DESCRIPTION OF THE DRAWINGS

FIG. 2 illustrates digital product entries in a master digital catalog system.

DETAILED DESCRIPTION OF PREFERRED EMBODIMENTS

Figure 1:
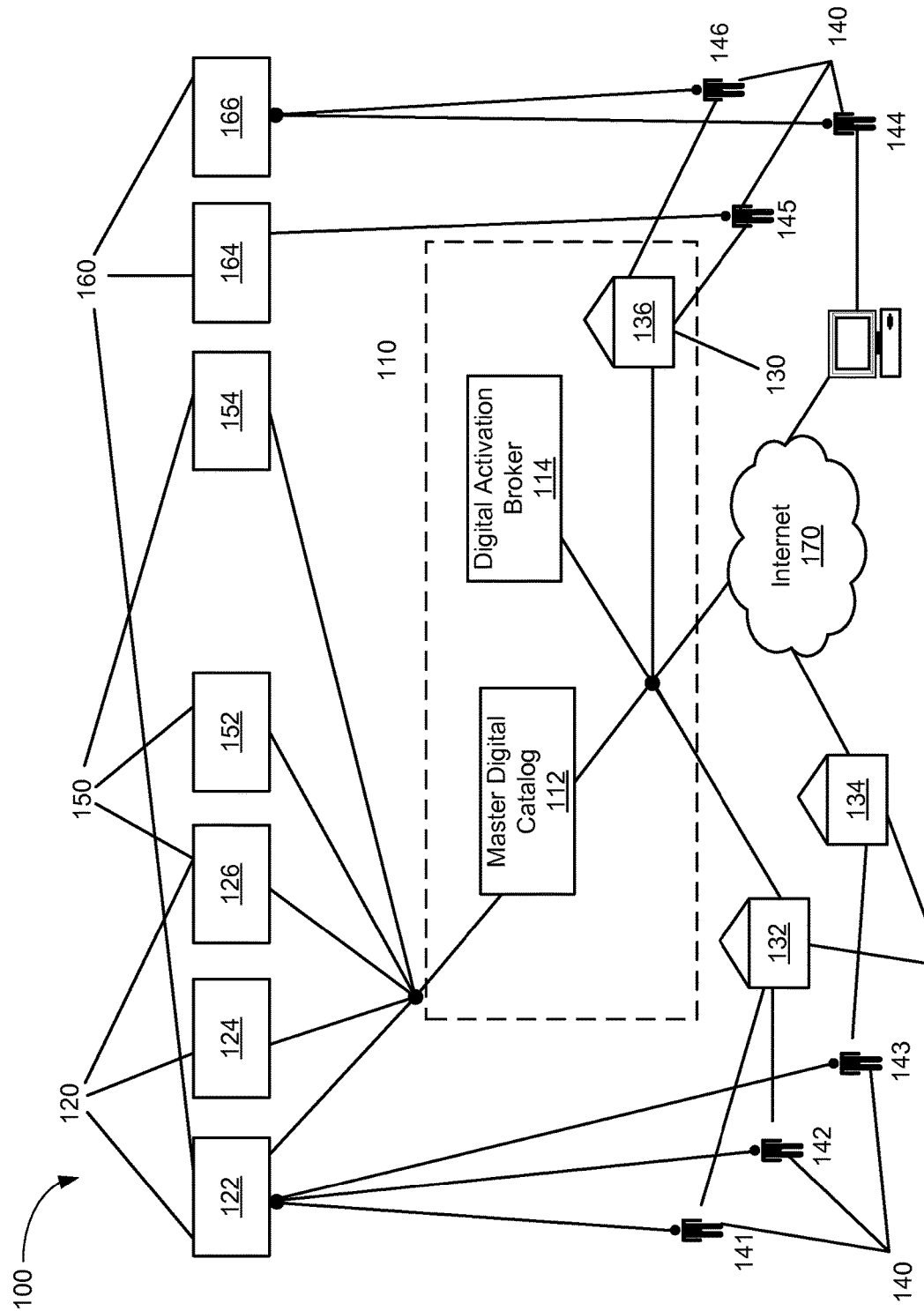
FIG. 1 is a schematic diagram of a system for distributing digital media content from content providers to customers.

A retailer or other point-of-transaction (POT) provider for digital media content often acquires that content from numerous content providers. Similarly, a single content provider may sell its digital media content to numerous POT systems. Moreover, content providers may use different Digital Rights Management (DRM) systems to protect their digital media content. As a result, each entity must make its systems interoperable with a large number of disparate systems. The present disclosure describes a distribution system that allows each content provider to use its own DRM protection on its digital media content while reducing the number of systems with which content providers and POT systems must interact.

As used herein, digital media content may include any media item that is offered for sale as a digital product, such as books, textbooks, images, audio (music or books on tape), videos, and software. Different encodings or different editions of a media item may be considered different digital products. In some instances, a digital product may be multiple media items bundled into a single resale package such as a book and a video, two videos, or software and a book.

A content provider may be any entity that sells digital media content. In some instances, the content provider will be the content owner and will have control of the rights to the content. In other cases, the content provider will be a distributor that has purchased a number of licenses to the digital media content. A distributor may also only have the right to sell an encrypted or DRM-protected digital product, which must then be activated by the content provider.

A POT system is broadly defined to include traditional physical point-of-sale systems, an Internet virtual store, a software store installed on a computer system such as an "App," or any other system whose goal is to convey access rights to digital media content. A single POT system may have multiple interfaces for transacting with customers, such as a virtual and a physical store. Alternatively, a single retailer may have multiple POT systems, such as one POT as a virtual store and another POT as a physical store.

The described features, structures, or characteristics may be combined in any suitable manner in one or more embodiments. Those skilled in the art will recognize that the invention can be practiced without one or more of the specific details, or with other methods, components, materials, etc. In other instances, well-known structures, materials, or operations are not shown in detail to avoid obscuring aspects of the invention.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawing or Detailed Description is for illustrative purposes only and is not meant to imply a required order, unless specified to require an order.

Embodiments may include various steps, which may be embodied in machine-executable instructions to be executed by a computer system. A computer system comprises one or more general-purpose or special-purpose computers (or other electronic devices). Alternatively, the computer system may comprise hardware components that include specific logic for performing the steps or comprise a combination of hardware, software, and/or firmware.

Embodiments may also be provided as a computer program product, including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by the physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computer systems, such as the server and/or clients. A computer system may comprise a workstation, laptop computer, disconnectable mobile computer, server, mainframe, cluster, so-called "network computer" or "thin client," tablet, smart phone, personal digital assistant or other hand-held computing device, "smart" consumer electronics device or appliance, or a combination thereof.

The network may include communications or networking software, such as the software available from Novell, Microsoft, Artisoft, and other vendors, and may operate using TCP/IP, SPX, IPX and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as ASIC, PAL, PLA, PLD, Field Programmable Gate Array (FPGA), or other customized or programmable device. The memory may include static RAM, dynamic RAM, flash memory, ROM, CD-ROM, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, a tape drive, an optical drive, a magneto-optical drive, or other means to read a storage medium. A suitable storage medium includes a magnetic, an optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s). Messages may be appropriately formatted using XML, SOAP, and/or WSDL.

Several aspects of the embodiments described will be illustrated as software modules or components. As used herein, a software module or component may include any type of computer instruction or computer-executable code located within a memory device. A software module may, for instance, comprise one or more physical or logical blocks of computer instructions, which may be organized as a routine, a program, an object, a component, a data structure, etc., that performs one or more tasks or implements particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general purpose computers; computer programming tools and techniques; computer networks and networking technologies; digital storage media; authentication; access control; and other security tools and techniques provided by public keys, encryption, firewalls, and/or other means.

FIG. 1 is a block diagram of a system 100 for selling digital media content from one or more content providers 120 to one or more POT systems 130 for resale to customers 140. In one embodiment, the digital activation hub 110 comprises a master digital catalog 112 and a digital activation broker 114. In some embodiments, the digital activation hub 110 may also comprise a POT system 136 for direct sale to customers. As discussed in more detail below, the master digital catalog 112 maintains an updateable listing of products that are offered for sale by the digital activation hub 110. The digital activation broker 114 fulfills orders for products by POT systems 130. A customer 144 may be connected to a POT system 134 through the Internet, and POT system 134 can be connected to the digital activation hub 110 through the Internet 170. Those skilled in the art will recognize other ways that POT systems 130 may communicate with their customers 140 and the digital activation hub 110.

Authorization code providers 150 and fulfillment providers 160 are used to control access to the digital media content in accordance with a DRM scheme. In one embodiment, a provider 126 is both a content provider 120 and an authorization code provider 150. Similarly, another provider 122 may be both a content provider 120 and a fulfillment provider 160. Many other permutations are possible. A content provider 124 may be separate from an authorization code provider 154 and a fulfillment provider 164. These providers may be separate interfaces to a single server or system, separate servers or systems of a single entity, or separate entities.

Master Digital Catalog

The master digital catalog 112 stores a complete listing 200 of all digital media content that is offered for sale by the digital activation hub 110 as illustrated by FIG. 2. Several exemplary digital products including a book 210, an audio book 230, and a movie 250 are shown as being listed in the master digital catalog 112. The master digital catalog 112 stores as metadata all attributes required to accurately present the digital product to the customer; to accurately account for the digital product transaction; and to activate the product and direct the customer to the digital fulfillment location. Metadata for a book 210 may include a unique ID 211, the title 212, the author's last name 213, the publisher 214, an image of the cover 215, a price 216, a content provider 122, an activation URL 217, a fulfillment URL 218, a computer limit 219, and encrypted data 220.

The unique ID 211 is different for every digital product in the master digital catalog 112 and allows for quick identification of digital products by the system. The title 212, author's last name 213, publisher 214, and image of the cover 215 can be conveyed to a POT system 130 to allow the POT system 130 and its customers 140 to identify which digital product is being sold. For brevity, other possible identifying fields known to those of skill in the art have been omitted from the figures. Identifying information that could be used in some embodiments as additional fields includes author's first name, preview images, 10 digit ISBN, 13 digit ISBN, copyright year, edition, edition type, and BISAC code. In another embodiment, the title 212 field might be simplified by having additional fields for the volume or chapter contained in that digital product. One field might specify the type of book divisions, such as "volume," "part," or "chapter," and the second field would then contain the letter or number for the particular division contained within that digital product.

The price 216 is conveyed to the POT system 130 to let it know how much the digital product costs to purchase. The price 216 can be the net price to the POT system 130 including any discounts and rebates, the list price without discounts and rebates, or the suggested resale price. In some embodiments, the master digital catalog 112 may have multiple price fields containing each of these prices. Other embodiments may have an indicator field specifying whether a price is list or net. The master digital catalog 112 may store additional information about the terms of the sale such as the currency for the price, whether the item is refundable, a percentage discount, a UPC, a sale end date when the item can no longer be sold, or an expiration date when the item will no longer be downloadable or usable.

The computer limit 219 specifies the number of computers on which the digital product can be used with a single purchase. In other embodiments, additional fields can be included that contain information about usage rights and consumption information. Consumption information may include product type (i.e., online or downloadable file), file format, or system requirements. In addition to the computer limit 219, other fields containing information on usage rights may include a print limit for the number of times the document may be printed, a copy/paste restriction field specifying any restrictions on the ability to copy and paste text, and the number of days until expiration, which specifies the length of time after download that the digital content may be accessed.

Various other fields including an activation URL 217, a fulfillment URL 218, and encrypted content data 220 are described in greater detail hereafter. In some embodiments, the activation URL 217 and the fulfillment URL 218 will not be fields associated with the digital product and a separate list will contain the activation URL and fulfillment URL for each content provider 120. Each content provider 120 could also be associated with a content provider code, which may be a unique alphanumeric code assigned to that particular content provider 120. This could be used to map digital products to the corresponding content provider 120. Alternatively, the master digital catalog 112 may contain a list of default values associated with a content provider 120 for each field that is not digital-product specific. If a field for a given digital product is left blank, the master digital catalog 112 can retrieve the value from the default list.

For a movie 250, author 213 and publisher 214 fields may instead be populated by a director 253 and/or a studio 254. The encrypted content data 220 field may be empty when the master digital catalog 112 does not contain encrypted content data for the movie 250. Some fields may be required, while others may be optional. In some embodiments, the content provider may be required to provide a list of default values for certain fields, but the field will be optional for individual digital products. In other embodiments, the default values will be optional, but the fields for individual digital products will be required if the default value is not specified. Some fields may be entirely optional, and the master digital catalog 112 will return a null response if those fields are empty when queried.

As will be recognized by those of skill in the art, many different data structures may be used to store digital products. Instead of overloading fields, such as the author 213/director 253 field, each entry for a digital product may include both an author and a director field and only use the field appropriate for the particular type of digital media. In other embodiments, a unique list may be used for each type of digital media and the list will only have those fields that are appropriate for that type of digital media. A person of skill in the art will recognize fields that are appropriate for media other than books.

Figure 3:
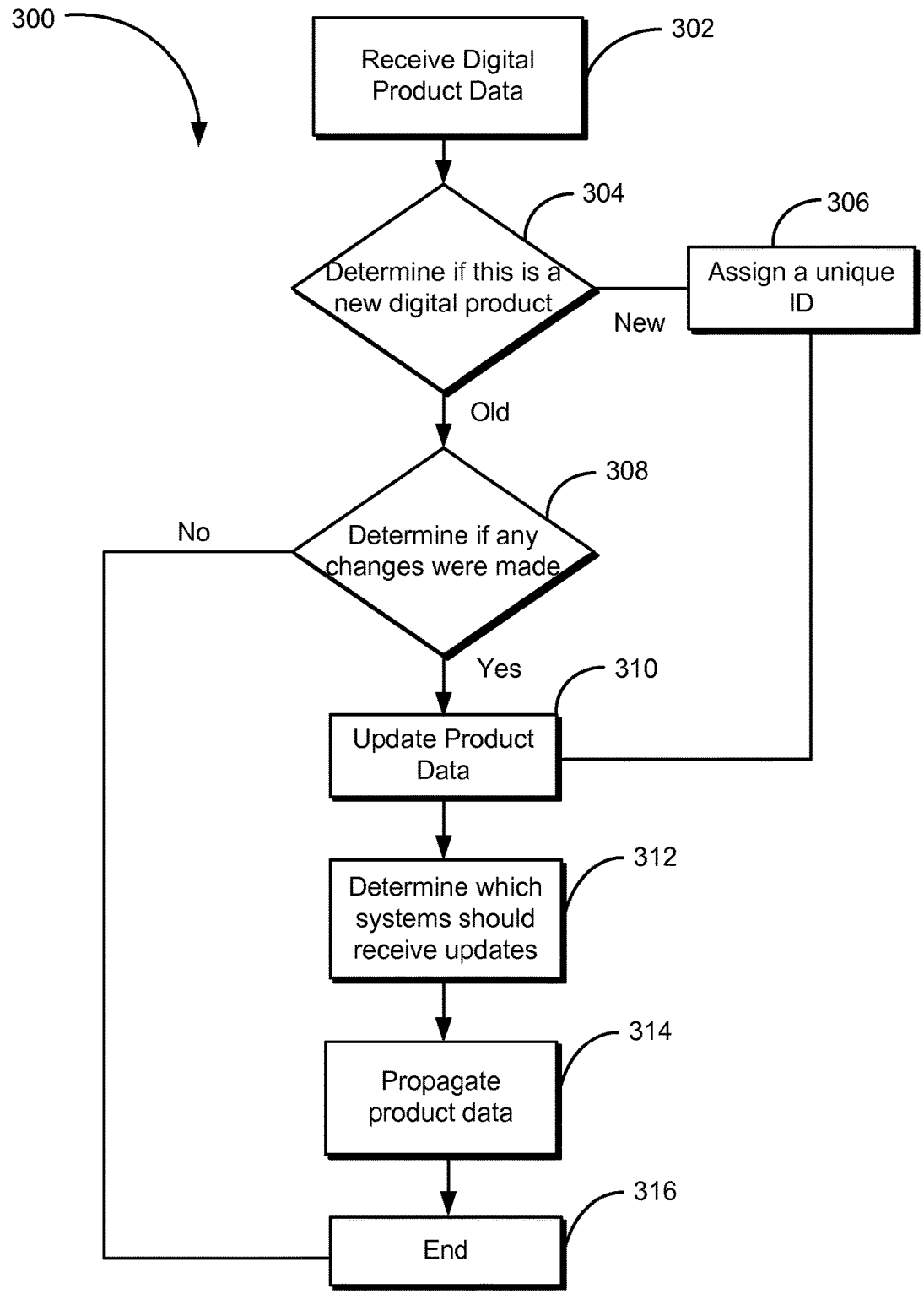
FIG. 3 is a flow chart of a method of adding or updating products in the master digital catalog system.

FIG. 3 is a flow chart of a method 300 of automatically loading digital product data into the master digital catalog 112. The method begins when it receives 302 product data for a digital product from a content provider 120. In some embodiments, the product data is uploaded as a file to a server such as an FTP server by a content provider 120 or a user with appropriate privileges. As a result, the master digital catalog 112 receives the product data when it recognizes a new or an updated file has been uploaded. The file may contain product data for multiple digital products, or the product data for a single digital product may be spread across several files. In other embodiments, the product data may be received as a request from a content provider 120 over a computer network. Alternatively, the product data may be received in response to the polling of content providers 120 by the master digital catalog 112 at regular time intervals. A single embodiment may have different methods of receiving product data from different content providers 120.

The method then determines 304 if the digital product data is an update for an existing digital product, or if this is the first time the digital product has been loaded. The product data may contain an indication that the digital product is new. If the content provider knows the unique ID for a digital product, the master digital catalog 112 may use receipt of the unique ID as an indicator that the digital product already exists in the catalog. Other indicators include the ISBN. Otherwise, the master digital catalog 112 may compare metadata fields from the product data received with the metadata stored in the master digital catalog 112 to determine if the digital product is new.

If the digital product is being loaded for the first time, the master digital catalog 112 assigns 306 a unique ID to the digital product. The unique ID may be randomly or sequentially generated by the master digital catalog 112, or it may be a unique attribute, such as the ISBN, or a hash of immutable fields. One of skill in the art will recognize that many different methods may be used for assigning the unique ID.

If the digital product data has been loaded before, the master digital catalog 112 compares the newly received product data to the previous product data to determine 308 if any changes were made. If no changes have been made, the method ends 316. This conserves resources by not unnecessarily updating 310 and propagating 314 product data that has not changed. If changes have been made, the method proceeds to step 310.

At step 310, the master digital catalog 112 updates the product data. In some embodiments, this may comprise moving or copying the old product data to an archive. This may be done by archiving the file(s) containing the product data or by archiving the data structures storing the product data. The new product data is then copied to a listing 200. In some embodiments, the listing 200 is simply a storage area containing product data files. In other embodiments, the product data is copied from the product data files into one or more data structures containing the listing 200. Some embodiments do not archive the previous file or product data and overwrite the previous version with the new version.

Next, the master digital catalog 112 must determine 312 which systems should receive the updates. In some embodiments, the master digital catalog 112 propagates updates to the digital activation broker 114. In other embodiments, the master digital catalog 112 does not propagate updates to the digital activation broker 114. In still other embodiments, the master digital catalog 112 will only propagate updates to the digital activation broker 114 if there were changes to certain fields such as the activation URL or fulfillment URL.

Only some of the POT systems 130 may be eligible or interested in receiving updates. The master digital catalog 112 may have a list of POT systems 130 that have subscribed to updates of the digital product in question. Similarly, the content provider 120 for the digital product may have specified which POT systems 130 are eligible to receive and which are prohibited from receiving an update. An update will only be propagated to a POT system 130 if it is both subscribed and eligible for the digital product. In other embodiments, the update may be propagated when a POT system 130 is either subscribed or eligible, such as if a content provider is seeking to promote a new product. Similarly, POT systems 130 may be deemed to be subscribed to all products and the POT systems 130 then differentiate between updates that are desired and not desired. A single update may involve multiple digital products. For embodiments only propagating some products to some POT systems 130, each product should be checked to determine which POT systems 130 should receive updates for which digital products.

The master digital catalog 112 then propagates 314 the updated product data to the appropriate systems. This may be performed in a variety of ways. For example the master digital catalog 112 may send updates at regular time intervals. The master digital catalog 112 may propagate a request as soon as it receives an update. The systems may poll the master digital catalog 112 for updates according to their own timeframes. A single embodiment may propagate the product data in different ways to different systems. In some embodiments, the content provider 120 may specify a time limit by which propagation must occur. When large numbers of products have been updated, the master digital catalog or the receiving system may limit the number of products that are updated at one time to prevent the propagation from timing out.

The master digital catalog 112 may propagate fewer than all data fields to the receiving systems. In some embodiments, the digital activation broker 114 only receives the unique ID, activation URL, and fulfillment URL. The POT systems 130 may receive all fields other than the activation URL and fulfillment URL. A content provider 120 may specify as part of its eligibility criteria that certain fields, such as the discount field, should only propagate to some POT systems 130. Other combinations of fields are possible. Once all the appropriate data has been propagated to the appropriate systems, the method ends 316.

Activation by the Digital Activation Broker

A POT system 130 may prepare a virtual or tangible catalog based on the product data that has been propagated to it. It can then present this catalog to customers 140, so that they may order a digital product. The customer 140 selects a product and compensates the POT system 130 for the product. The POT system 130 then transmits an order for the digital product to the digital activation broker 114. The order includes the unique ID for the digital product and the POT location.

Figure 4:
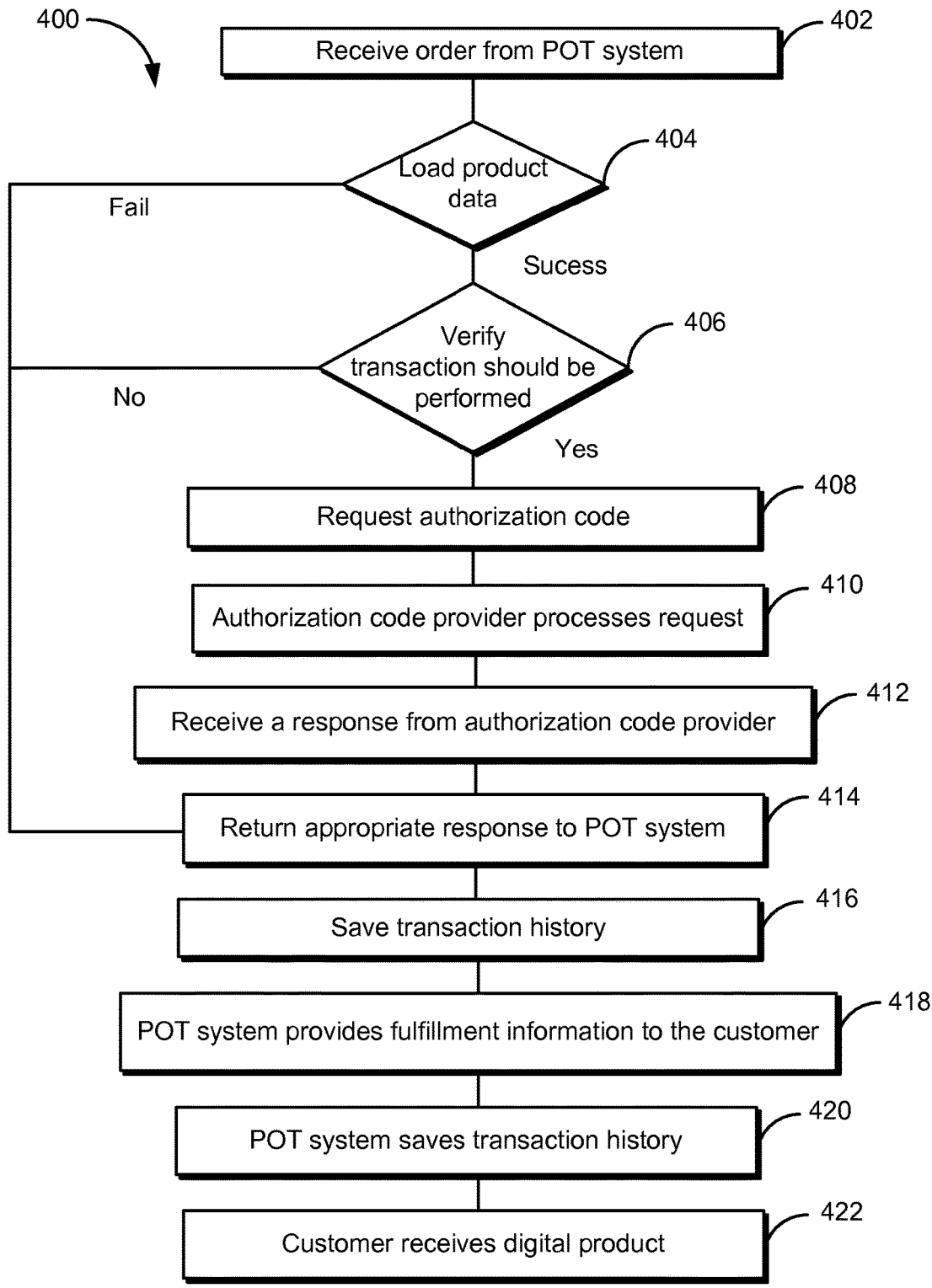
FIG. 4 is a flow chart of a method of processing an order for a digital product.

FIG. 4 is a flow chart of a method 400 used by the digital activation broker 114 to process an order for a digital product from a POT system 130. The digital activation broker 114 receives 402 an order from a POT system 130 with the unique ID and a POT location. In some embodiments, instead of the unique ID, an ISBN, a UPC, or other identifier may be used or more than one identifier may be used. The POT location can be an ID number associated with a particular POT system 130, such as a store number. It may also be a physical or web address for the POT system. The digital activation broker 114 may be configured to accept different identifiers and POT location formats for different POT systems 130. In some embodiments, the POT location is inherent in the request format, like an IP address for an IP packet, and the digital activation broker 114 can automatically use this address as the POT location.

The digital activation broker 114 may also have additional required or optional fields. For example, the digital activation broker 114 may require that login information, such as a user name and password, be submitted with an order. Alternatively, a username and password may be required from a POT system 130 before the digital activation broker 114 will accept any orders from that POT system 130. The digital activation broker 114 may require a user name and password for only some transactions. The digital activation broker 114 may determine whether login information is required based on which content provider 120 is offering the digital product ordered or which POT system 130 is placing the order. In some embodiments, finer granularity may be provided and the decision to require a password may be made on a product-by-product basis.

In some embodiments, the POT system 130 may submit a POT transaction ID or application information. The POT transaction ID is a unique number that identifies the particular order that was placed. The POT transaction ID may only need to be unique for a given POT location. The digital activation broker 114 can then uniquely identify each transaction by referencing the POT location and the POT transaction ID. In other embodiments, the POT system 130 does not submit a POT transaction ID and a digital activation broker transaction ID is instead generated by the digital activation broker 114. The POT system 130 may include information on what kind of application is submitting the request. The digital activation broker 114 may need this application information to appropriately decode the request. In other embodiments, the digital activation broker 114 may automatically determine the format of the request and appropriately decode it or use the POT location to determine how the message should be decoded.

The digital activation broker 114 then loads 404 product data based on the identifier. The digital activation broker 114 may load the product data by submitting a request to the master digital catalog 112. In other embodiments, the digital activation broker 114 has the necessary product data saved in its own memory. The product data may include an activation URL and a fulfillment URL for the digital product. In some embodiments, an address other than a URL will be used to specify the activation location or the fulfillment location. The product data may also include the content provider, the content provider code, UPC, the sale end date, and the expiration date. Those of skill in the art will recognize other data fields that may be desirable to load. If loading product data fails, the digital activation broker 114 moves to step 414.

If the product data was loaded successfully, the digital activation broker 114 then verifies 406 that the transaction should be performed. For example, the digital activation broker 114 may deny a transaction if it determines that the current date is later than the sale end date or the expiration date. Alternatively, the digital activation broker 114 may verify whether the POT system 130 is delinquent on past payments for digital products or if a contemporaneous payment has been authorized or rejected. If payment has not been or is unlikely to be received, the digital activation broker 114 may deny the transaction.

The information submitted by the POT system 130 with the request may also lead the digital activation broker 114 to deny the request. The POT system 130 may have submitted an incorrect username and password, the POT location information or POT transaction ID may be invalid, the request may be duplicitous, or the POT system 130 may not have the right to order the product. If any of the information is not valid, the request may be denied. In some embodiments, the information submitted by the POT system 130 may be verified before step 404. The digital activation broker 114 proceeds to step 414 if the transaction is denied. Otherwise, it proceeds to step 408 to request an authorization code.

The digital activation broker 114 uses the activation URL to submit a request 408 for an authorization code to an authorization code provider 150. In some embodiments, the digital activation broker 114 may request an authorization credential other than an authorization code, such as a file, key, or different credential. The authorization code provider 150 may be the content provider 120 or an entity other than the content provider 120. This entity may be an agent of the content provider 120. Alternatively, when the content provider 120 is a distributor, this entity may be the content owner or someone higher in the distribution chain. The digital activation broker 114 submits the request for an authorization code with sufficient information for the authorization code provider 150 to process the request. In some embodiments, the digital activation broker 114 submits only the unique ID. In other embodiments, a different identifier, such as the UPC or ISBN, is used to identify the digital content.

The digital activation broker 114 may also send application or user information in the request, allowing the authorization code provider 150 to know how to decode the request. The authorization code provider 150 may require a user name and password to access the system. The user name and password could be used as user information by the authorization code provider 150 in some embodiments. The digital activation broker 114 may send different application and user information to different authorization code providers 150 based on the requirements of that authorization code provider 150.

Some authorization code providers 150 may wish to receive a copy of the POT location and POT transaction ID that were submitted to the digital activation broker 114 by the POT system 130 making the order. This information can be used to track sales information for marketing purposes, or it could also be kept to reconcile sales for billing purposes. The digital activation broker 114 may determine whether to submit this information based on the authorization code provider 150 receiving the order or the product being ordered.

In many cases, the request submitted by the POT system 130 to the digital activation broker 114 will be similar or identical to the request submitted by the digital activation broker 114 to the authorization code provider 150. However, the digital activation broker 114 may be required to convert the format of the request or map an identification number used by one system to a corresponding identification number used by a different system (e.g., a UPC to an ISBN). This permits a POT system 130 to place an order from a content provider 120 using a system that may not be compatible with that content provider 120 or the corresponding authorization code provider 150. Similarly, the POT system 130 can be insulated by changes or upgrades to the content provider 120 or authorization code providers 150. This allows a POT system 130 to offer content from many content providers 120 without significant overhead.

Once the authorization code provider 150 receives a request from the digital activation broker 114, it then processes 410 that request. As part of this processing, some authorization code providers 150 may assign a provider transaction ID to the request that uniquely identifies the transaction for the authorization code provider 150. In some embodiments, the digital activation broker 114 may require the authorization code provider 150 to generate a provider transaction ID. The authorization code provider 150 may then verify that the username and password are correct; that the unique ID, POT location, POT transaction ID, and application information are all valid; and that the POT system and digital activation broker 114 are authorized to make the purchase. If no problems are found, the authorization code provider 150 produces an authorization code.

The authorization code can be produced by the authorization code provider 150 in many different ways. Some authorization code providers 150 may buy large blocks of authorization codes from the content owner. As the authorization code provider 150 distributes these authorization codes, it may keep a list of which authorization codes have been used and which have not been used. The authorization code provider 150 would then produce an authorization code by selecting the next unused authorization code from the list. Other authorization code providers 150 may own the content or have permission to generate their own authorization codes 150. These authorization code providers 150 may generate authorization codes using a known or proprietary formula or using a random number generator.

The digital activation broker 114 then receives 412 a response from the authorization code provider 150. The response may contain different fields if the request was successful versus if it failed. In some embodiments, all responses may have the same fields with one of the fields indicating whether the request was successful. The response may be an object with variables for each possible field of the response. The responses may have fields identifying the transaction such as the provider transaction ID, the POT transaction ID, the POT location, and the unique ID or another product identifier. In cases where the request was successful, the response contains the authorization code produced by the authorization code provider 150. The response may also contain the fulfillment URL.

If the request was not successful, the response may contain failure information. This failure information may include the failure type, a failure code, and a written description of the failure. A different failure code may be assigned to each request field that may be found invalid. A single failure code may also be assigned to multiple fields, such as if the username or the password is invalid. One or more failure codes may also apply to internal errors, such as if an attempt to validate an input field or produce an authorization code failed. The written description contains a human-readable description of the problem. Each failure code may have a single written description, or more or less than one written description per failure code, assigned to it. The written description may also be dynamically populated with data from the error. The digital activation broker 114 may receive different response formats from different authorization code providers 150.

Next, the digital activation broker 114 returns 414 an appropriate response to the POT system 130. This response will also indicate whether the transaction was successful. In some cases, the response will indicate a failure because of a problem detected by the digital activation broker 114. In other cases, a failure will be indicated based on the response received from the authorization code provider 150. The digital activation broker 114 may return the response in a format preferred by the POT system 130. The POT system 130 may have different message formats for responses indicating success and responses indicating failure, or it may use the same format for either type of response and leave unused fields empty. If a single format is used, the response may include a field indicating whether the transaction was successful.

The response may have fields with transaction identifying information including the POT location, the POT transaction ID, and the unique ID or other identifier used by the POT system 130 to identify the product. In some embodiments, the provider transaction ID may be returned to the POT system 130. For successful transactions, the response may include the authorization code, the fulfillment URL, and/or the encrypted content data. In some embodiments, the encrypted content data is sent to the POT system 130 by the master digital catalog 112 and does not need to be resent. The response for a successful transaction may then contain only the authorization code or fulfillment URL. For digital products that do not include encrypted content data in the master digital catalog 112, the customer 140 may need to use the authorization code to access or download the digital media item from the fulfillment provider 160. For some POT systems 130, the response may include standard instructions on acquiring the digital product, which may be determined based on the content provider 120 or product in question. For other POT systems 130, the response may include an instruction code that the POT system 130 can use to look up standard instructions.

If, for any reason, the transaction was not successful, the digital activation broker 114 may return failure information. The failure information may include a failure type, failure code, and failure description. The failure code may be any of the codes received by the digital activation broker 114 from the authorization code provider 150. In some embodiments, the failure codes may indicate whether the digital activation broker 114 or the authorization code provider 150 rejected the transaction. In other embodiments, the digital activation broker 114 may hide the authorization code provider 150 from the POT system 130 and use the digital activation broker's 114 own failure codes.

The digital activation broker 114 may then save 416 the messages or their fields to a transaction history log. The saved information may include the date and time; transaction identifying information, such as POT location, POT transaction ID, provider transaction ID, and unique ID; the authorization code and fulfillment URL for successes; and the failure type, failure code, and failure description for failures. If different failure codes were used by the digital activation broker 114 and authorization code provider 150, the transaction history may save one or both codes. In some embodiments, the authorization code may not be saved when the content provider 120 or authorization code provider 150 does not allow it. The transaction history allows the digital activation broker 114 to perform other functions on the transaction, such as a void, a refund for unused codes, or an authorization code lookup. The transaction history can also be used for billing purposes to reconcile sales with POT systems 130, content providers 120, and authorization code providers 150.

The POT system 130 provides 418 the customer 140 with the fulfillment information necessary to receive the digital product. This may be the encrypted content data, the activation code, and/or the fulfillment URL. The POT system 130 may perform this step in many different ways for virtual POT systems 130, including emailing the fulfillment information, popping up a website with the fulfillment information, or redirecting the customer directly to the fulfillment URL. For non-virtual POT systems 130, the authorization code and fulfillment URL may be printed on a receipt. Those skilled in the art will recognize many other ways to convey the fulfillment information to the customer.

The POT system 130 may also save 420 the transaction history into the POT system's 130 own transaction history log. In addition to the information saved by the digital activation broker 114, the POT system 130 may wish to save customer information such as name, contact information, and payment or credit card information. The POT system 130 may also determine whether to save the authorization code in its transaction history based on whether this is permitted by the content provider 120 and/or authorization code provider 150.

The customer 140 then receives 422 and consumes the digital product. The digital activation broker 114 may provide the customer with digital products under a variety of DRM schemes set by a content manager, such as the content owner, content provider 120, and/or authorization code provider 150. In some embodiments, the digital product is only accessible online from a fulfillment provider 160 and the authorization code must be entered for each use. Some fulfillment providers 160 may associate the authorization code with the customer's 140 login information during an initial setup, so the customer 140 may use the digital product by logging into the fulfillment provider's website without again providing the authorization code. Other content managers may allow the customer 140 to keep a copy of the digital product either downloaded from the fulfillment provider 160 or received as encrypted content data from a POT system 130. The authorization code may be needed to download the digital product or decrypt the encrypted content data. Some content managers may allow the customer 140 to receive encrypted content data from the POT system but then require the customer 140 to use the authorization code and fulfillment location to register the content and associate it with a particular computer or computer system as part of the decryption process.

Figure 5:
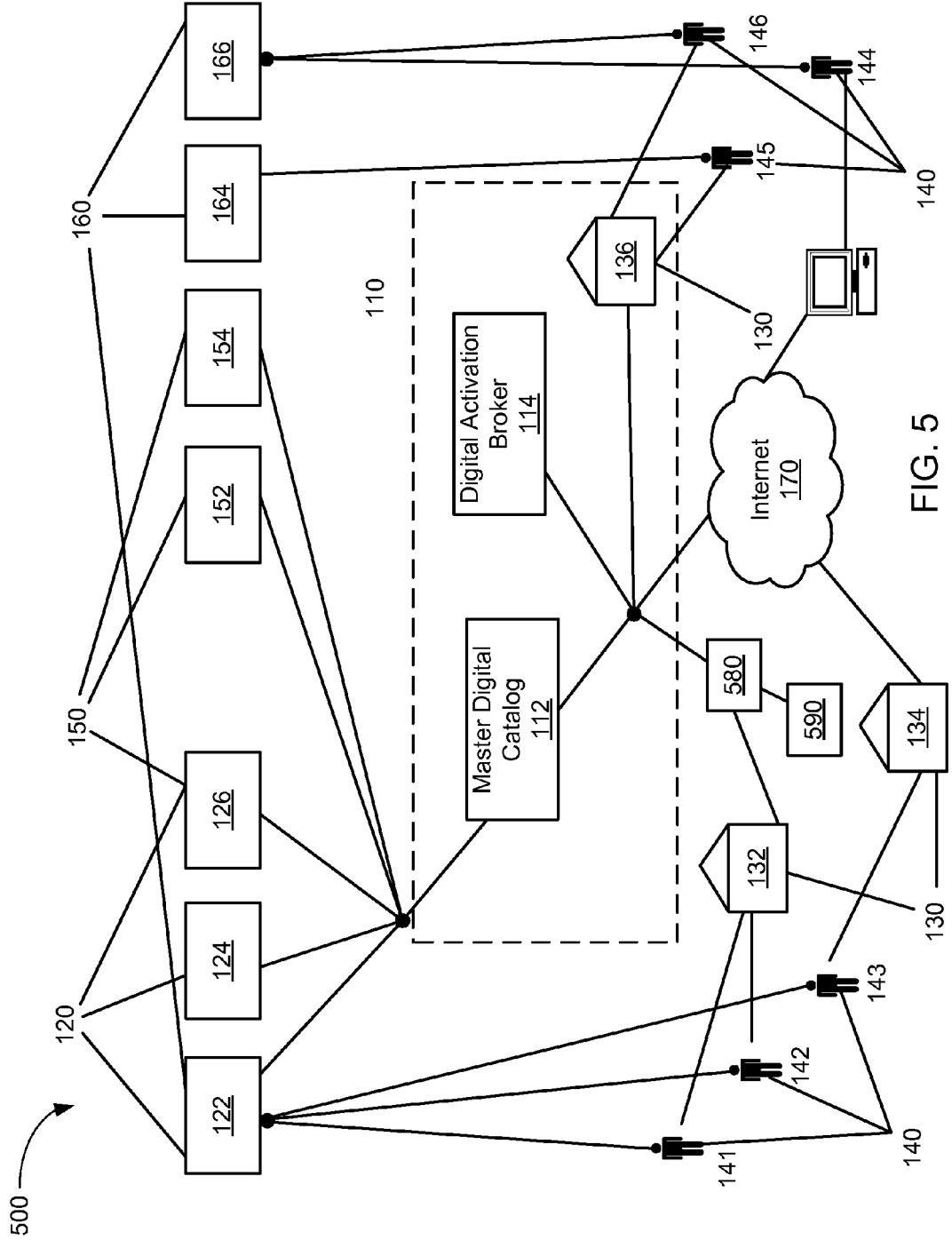
FIG. 5 is a schematic diagram of a system for distributing digital media content that includes a payment processor.

FIG. 5 is a schematic diagram of a system 500 where the POT system 130 uses a payment processor 580 to process the payment transaction. The payment processor 580 may validate credit card, check, electronic check, ACH, PayPal, or other payment service information to confirm that the POT system 130 will receive the payment being proffered by the customer 140. The payment processor 580 interacts with a processing company 590 to validate the payment. The payment processor 580 can be configured to perform some or all of the steps of ordering a product from the digital activation broker 114. This may make it even simpler for POT systems 130 to interact with the digital activation broker 114. In some embodiments, the payment processor 580 may provide a register and/or a credit card terminal that will interact with the payment processor's 580 systems and convey all information necessary for the payment processor 580 to place an order. In other embodiments, a virtual POT system 130 may link to the website of the payment processor 580 or embed an object from payment processor 580 in the customer website provided by the POT system 130. Alternatively, the POT system 130 may transmit any necessary information to the payment processor using the POT system's 130 own hardware or software.

Figure 6:
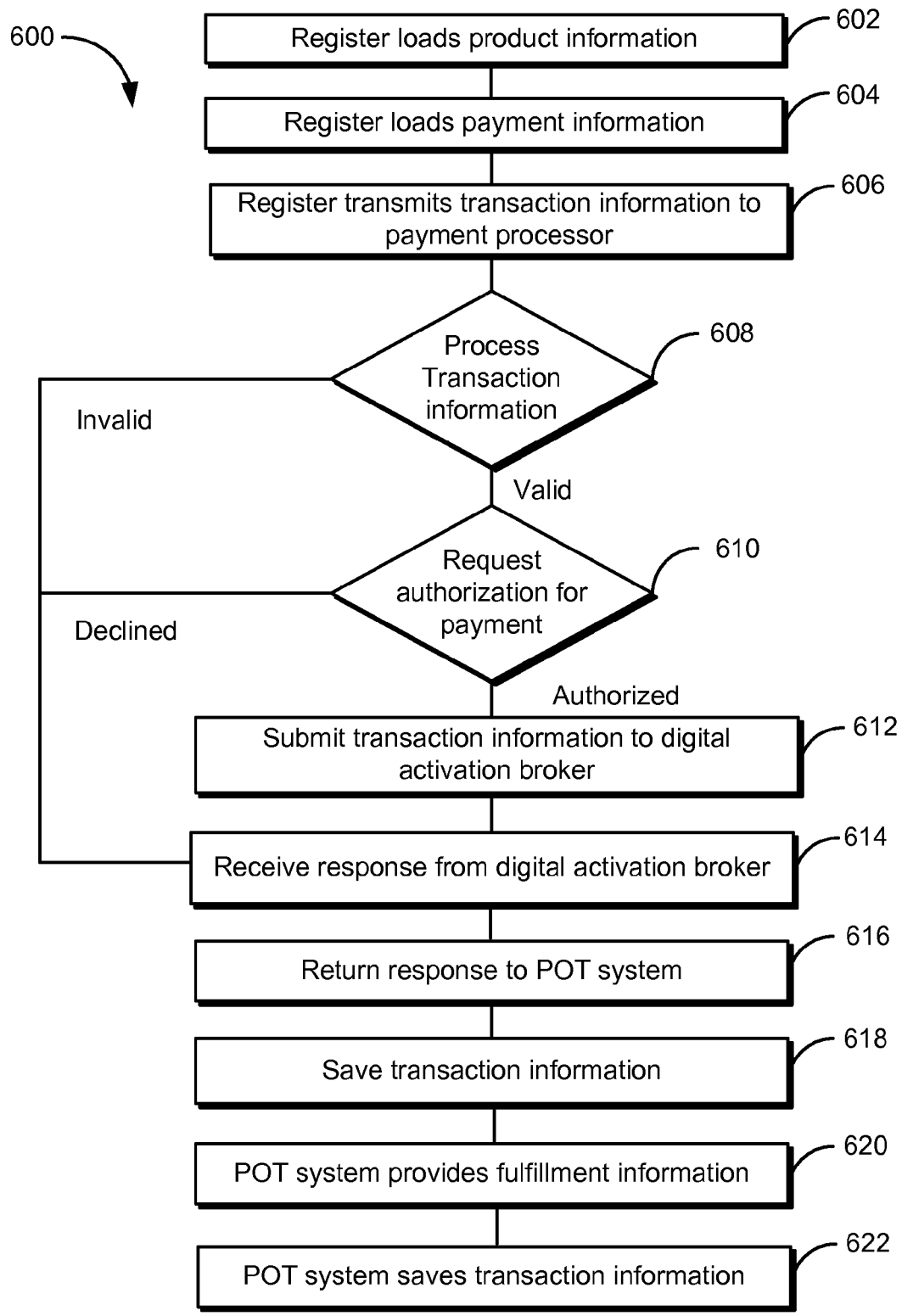
FIG. 6 is a flow chart of a method of processing an order for a digital product with a payment processor.

FIG. 6 is a flow chart of a method 600 of processing a transaction by a payment processor 580. In one embodiment, the POT system 130 scans a barcode presented by the customer 140, and the register automatically loads 602 product information. The bar code may be on a piece of paper or cardboard with a picture or description of the digital product. For some content providers 120, the bar code may be on a package for a storage medium containing the encrypted content data for the digital product, such as a CD or DVD. For virtual stores, the customer 140 may select the product using any method known in the art, such as clicking on the picture or description of the product.

The customer 140 then provides payment information to the POT system 130, which is automatically or manually loaded 604 into the register. For example, the customer 140 could swipe his or her credit card with the credit card terminal, which then transfers the information to the register. In other embodiments, the register could convey the product information to the credit card terminal, and the credit card terminal could perform the further steps needed of the POT system 130. Alternatively, both the register and credit card terminal could use a single back-end system that stores the information.

The register then transmits 606 the transaction information to the payment processor 580. The transaction information may include the bar code and credit card information. The bar code could also be translated into other identifying information, and information for a payment other than a credit card could be sent to the payment processor 580. In some embodiments, a POT location and POT transaction ID could be sent to the payment processor 580. In other embodiments, the POT location and POT transaction ID are inherently transmitted or created as part of the payment processing request.

The payment processor 580 then receives 608 the transaction information and begins processing the information. As part of this initial processing, the payment processor 580 may determine whether the transaction information is valid. This may include determining whether the credit card number has the correct number of digits or that any other fields are not within acceptable ranges. If the information is invalid, the payment processor 580 may jump immediately to step 616. In other embodiments, the register may ensure that transaction information is valid before transmitting it to the payment processor 580. The payment processor 580 then assumes all information is valid.

Next, the payment processor 580 may request 610 authorization for the payment. The payment processor 580 may do so by submitting the credit card information to the appropriate processing company 590 to authorize the payment. The processing company 590 may respond that the payment is authorized or declined. If the payment is declined, the payment processor 580 may jump immediately to step 616.

The payment processor 580 then submits 612 transaction information to the digital activation broker 114. The payment processor 580 may submit all the information from the POT system 130 including the unique ID, UPC, or ISBN for the product; POT location; POT transaction ID; login information; and application information. In some embodiments, the payment processor 580 will send a POT location and POT transaction ID corresponding to the POT system initiating the transaction. In other embodiments, the payment processor 580 always sends the same POT location representative of itself and creates its own POT transaction IDs.

The payment processor 580 then receives 614 a response from the digital activation broker 114 in the format discussed above. The response may contain a field indicating success, the POT location, the POT transaction ID, the provider transaction ID, the authorization code, the fulfillment URL, the encrypted content data, the failure type, the failure code, or the failure description.

The payment processor 580 returns 616 a response to the POT system 130. The response may contain information received from the digital activation broker 114, information received from the processing company 590, information generated by the payment processor 580, or some combination thereof. For example, the response may indicate that the payment was declined or that the authorization request failed. If the response is successful, the payment processor 580 may provide the authorization code and fulfillment URL to the register and direct the register to print this information directly on the receipt.

The payment processor 580 may save 618 transaction information to a transaction log. In some embodiments, the payment processor 580 may save all messages sent and received. Alternatively, it may only save information that is not redundant or only save a few important or key fields. This saved information can then be used to reconcile sales with the digital activation broker 114 and the POT systems 130.

The POT system 130 then provides 620 the digital product or fulfillment information for the digital product to the customer 140. In some embodiments, the POT system 130 need only hand the receipt to the customer 140, which lists the authorization code and fulfillment URL for the digital product. The register may also print instructions for accessing the digital content on the receipt. These instructions may be received in the message from the payment processor 580 or may be standard for all customers. In some embodiments, the paper or cardboard containing the barcode that the customer used to check out may have instructions on accessing the content. As before, the register or POT system 130 may then save 622 a copy of the transaction.

Voiding by the Digital Activation Broker

In some cases, a customer 140 may wish to return or void a purchase. In some embodiments, the customer 140 voids the transaction by submitting a void request directly to the fulfillment provider 160. The fulfillment provider 160 then must provide a refund to the customer 140. It may do so by providing money directly to the customer 140. Alternatively, the fulfillment provider 160 may send a message to the digital activation broker 114 to request the POT system 130 to refund the purchase.

Figure 7:
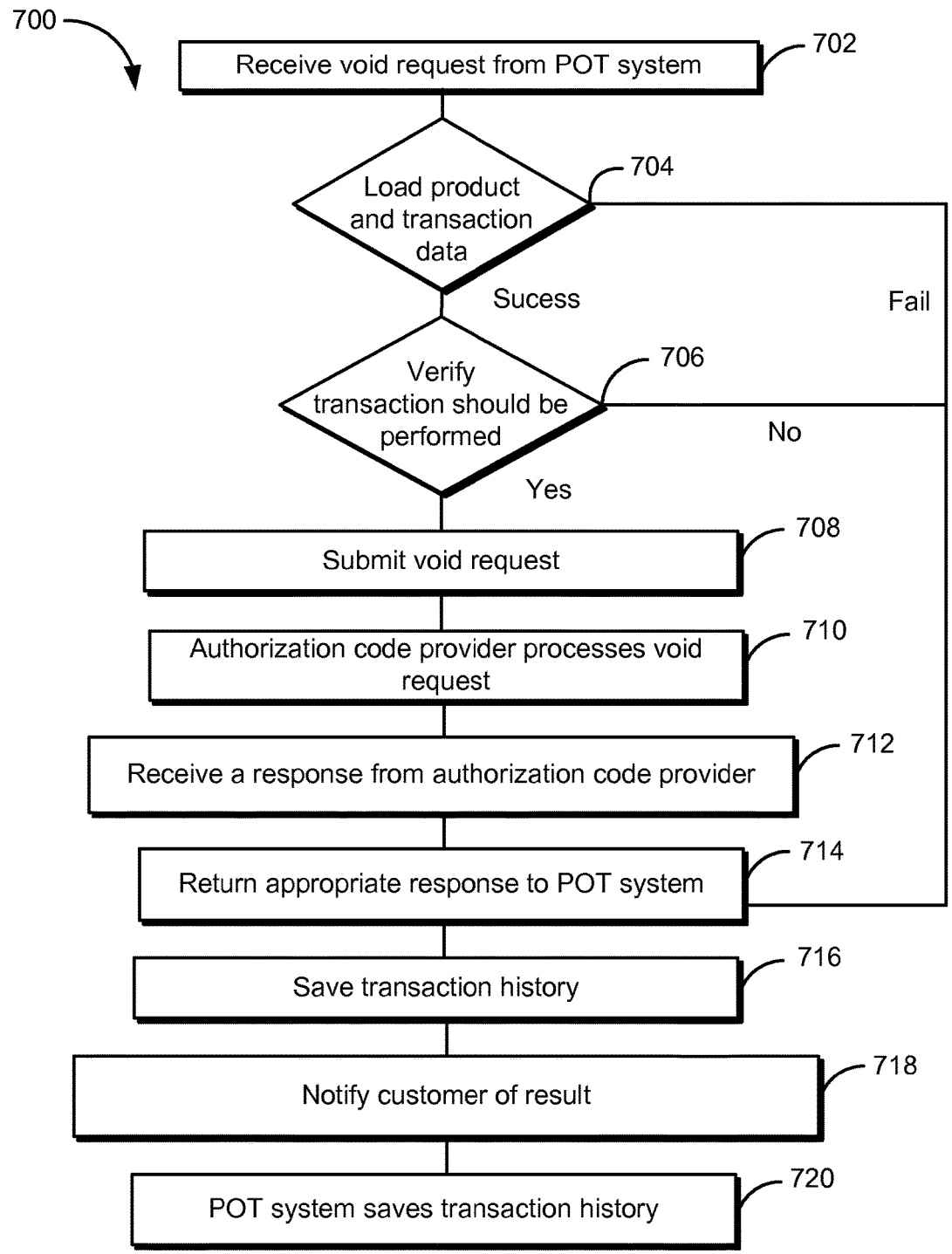
FIG. 7 is a flow chart of a method of voiding a purchase of a digital product.

FIG. 7 shows a method 700 by the digital activation broker 114 of voiding purchases where the POT system 130 is requested to void the transaction by the customer 140. The method is disclosed for a system 100 without a payment processor 580, but one of skill in the art will recognize how to adapt it for a system 600 with a payment processor 580 or how the payment processor 580 might initiate a void if there are problems with the payment.

The digital activation broker 114 receives 702 a void request from the POT system 130 based on the customer's 140 instruction. The POT system 130 provides a product identifier such as the unique ID, UPC, or ISBN and a transaction ID. In some embodiments, the POT system 130 may provide the POT location and the POT transaction ID to identify the transaction. In other embodiments, the POT system 130 may have stored the provider transaction ID or the date and time and may submit that information to the digital activation broker 114. As previously discussed, the POT system 130 may also submit login information and application information as part of the void request. The digital activation broker 114 may be able to accept differently formatted requests from different POT systems 130.

The digital activation broker 114 loads 704 the product and transaction data based on the product identifier and transaction identifier received from the POT system 130. The product data may be loaded from the master digital catalog 112 or product data saved in memory. Alternatively or additionally, the product data and transaction data may be loaded from the transaction history log. The product data may include the unique ID, UPC, ISBN, content provider, content provider code, sale end date, expiration date, activation URL, and/or fulfillment URL. The transaction data may include the POT location, POT transaction ID, provider transaction ID, and/or time and date. The load command may fail when, for example, the digital activation broker 114 does not find product data or transaction data for the product identifier or transaction identifier supplied by the POT system 130. If the load command fails, the digital activation broker 114 may immediately jump to step 714.

If the data is loaded successfully, the digital activation broker 114 verifies 706 that the transaction should be performed. The digital activation broker 114 may save a time limit for voiding transactions, or voiding may not be allowed for some transactions. Alternatively, the transaction history log may reflect that the transaction has already been voided or that the authorization failed. A particular POT system 130 may be flagged for suspicious activity and the digital activation broker 114 will request human approval before processing the void request or will automatically decline the void request. In some embodiments, the digital activation broker 114 may confirm the login information is correct at this step. In other embodiments, the login information will be verified before the product data and transaction data are loaded. If the verification fails, the digital activation broker immediately jumps to step 714.

Next, the digital activation broker 114 uses the activation URL to submit 708 a request to void the transaction to the authorization code provider 150. In other embodiments, the request to void the transaction is sent to the fulfillment provider 160 using the fulfillment URL. The request may include a transaction identifier and a product identifier. Some authorization code providers 150 may only require that a transaction identifier be supplied. The transaction identifier may be the provider transaction ID. The POT location, POT transaction identifier, and date and time are also possible transaction identifiers. The product identifier may be a unique ID, a UPC, an ISBN, or similar identifier. The request to void the transaction may also include login information and application information. In some embodiments, the digital activation broker 114 may submit differently formatted requests to different authorization code providers 150, or it may determine whether a request should be submitted to the authorization code provider 150 or fulfillment provider 160.

The authorization code provider 150 then processes 710 the request to void the transaction. The authorization code provider 150 may confirm that the transaction is eligible to be voided. Some digital products may no longer be eligible for voiding once they have been accessed, downloaded, or printed. Others may have limits on the number of times they can be accessed, downloaded, or printed and still be voided. Some authorization code providers 150 may ask the fulfillment provider 160 whether the content is eligible for voiding. Some fulfillment providers 160 may automatically notify the authorization code provider 150 when the transaction is no longer eligible to be voided. In some embodiments, the customer 140 must surrender the digital product to the fulfillment provider 160 before attempting to void the transaction at the POT system 130. Alternatively, there may be a date or void deadline after which the transaction can no longer be voided. The authorization code provider 150 may determine whether the void deadline has passed without contacting the fulfillment provider 160. The void request may also fail for other reasons: the authorization code provider 150 may not find the transaction or product to have been based on the transaction identifier or product identifier submitted; the login information may have been incorrect; or the authorization transaction may not have been completed successfully.

If the authorization code provider 150 determines that a void should be allowed, it then voids the transaction. The authorization code provider 150 may do so by notifying the fulfillment provider 160 to no longer allow access to the digital product. In other embodiments, the fulfillment provider 160 may stop allowing access as soon as the authorization code provider 150 asks whether a void is allowed. In those embodiments, the authorization code provider 150 may notify the fulfillment provider 160 if the void was unsuccessful, or it may ask the fulfillment provider 160 if the digital product is eligible to be voided as the last step before voiding the transaction. The authorization code may be deleted or placed on a bad key list. If the authorization code provider 150 purchases blocks of authorization codes, it may wish to reuse the authorization code.

The digital activation broker 114 then receives 712 a response from the authorization code provider 150. The response may contain different fields if the request was successful versus if it failed. In some embodiments, all responses may have the same fields with one of the fields indicating whether the request was successful. The response may be an object with variables for each possible field of the response. The objects or fields in the response may be the same as the response to the authorization request, and the unused fields may be unpopulated. The responses may have fields identifying the transaction, such as the provider transaction ID, the POT transaction ID, the POT location, the unique ID, and/or another product identifier. Some authorization code providers may return a new provider transaction ID for the void request.

The response may also include a field indicating whether the digital product has been downloaded and a field with the date that the digital product was downloaded. Alternatively, the response may include one or more fields indicating whether the digital product was accessed, was downloaded, was printed, or failed a void eligibility criteria, and the date that event occurred. Additionally, the response may include a field indicating whether the digital product has already been voided and a field for the date the digital product was voided. The response may also contain the failure type, the failure code, and a written description of the failure. In some embodiments, the failure code and failure description may indicate whether the void request failed the eligibility criteria and the date that the transaction no longer met the eligibility criteria. The failure type, failure code, and failure description may be included in addition to or instead of the fields indicating whether the digital product is no longer eligible for voiding or has already been voided.

The digital activation broker 114 then returns 714 an appropriate response to the POT system 130. This response will also indicate whether the transaction was successful. In some cases, the response will indicate a failure because of a problem detected by the digital activation broker 114. In other cases, a failure will be indicated based on the response received from the authorization code provider 150. The digital activation broker 114 may return the response in a format preferred by the POT system 130. The POT system 130 may have different message formats for responses indicating success and responses indicating failure, or it may use the same format for either type of response and leave unused fields empty. If a single format is used, the response may include a field indicating whether the void request was successful. The POT system 130 may use the same response format for authorization code requests and void requests with the unused fields left unpopulated.

The response may have fields with transaction identifying information including the POT location, the POT transaction ID, the unique ID, and/or other identifiers used by the POT system 130 to identify the product. In some embodiments, the original and/or new provider transaction ID may be returned to the POT system 130. If, for any reason, the transaction was not successful, the digital activation broker 114 may return failure information. The failure information may include a failure type, a failure code, and a failure description. The failure code may be any of the codes received by the digital activation broker 114 from the authorization code provider 150. In some embodiments, the failure code may indicate whether the digital activation broker 114 or the authorization code provider 150 rejected the transaction. In other embodiments, the digital activation broker 114 may hide the authorization code provider 150 from the POT system 130 and use the digital activation broker's 114 own set of failure codes. For some POT systems 130, a failure response may include standard instructions on additional actions the customer 140 may take if the customer 140 believes a void should be allowed. These instructions may be determined based on the failure code, content provider 120, and/or product in question. The instructions may be part of the failure description. For other POT systems 130, the response may include an instruction code that the POT system 130 can use to look up standard instructions, or that the POT system 130 have standard instructions for each failure code.

The digital activation broker 114 may then save 716 the messages or their fields to the transaction history log. The saved information may include the date and time; transaction identifying information such as POT location, POT transaction ID, new or old provider transaction ID, and unique ID; whether the content is no longer eligible for voiding and the date it became ineligible; whether the content was already voided and the date it was voided; and the failure type, failure code, and failure description. If different failure codes were used by the digital activation broker 114 and authorization code provider 150, the transaction history may save one or both codes. In some embodiments, the transaction history log may also save a reference, a pointer, or other identifier indicating the location in the transaction history log of the entry for the authorization request. Information already contained in the authorization request log entry may be omitted from the void request log entry as redundant. Including voids in the transaction history helps with reconciling sales with POT systems 130, content providers 120, and authorization code providers 150.

The POT system 130 then notifies 718 the customer 140 of the result of the void request. If the void request failed, the POT system 130 may inform the customer 140 of why it failed and assist the customer 140 with taking additional action if the customer 140 believes a void should be allowed. In some embodiments, the results of the void request, including the reason for any failure, are printed directly onto a receipt. If the void failed, the receipt may also contain instructions on additional actions the customer 140 may take if the customer 140 believes a void should be allowed.

The POT system 130 may also save 720 the transaction information into its own transaction history log. In addition to the information saved by the digital activation broker 114, the POT system 130 may wish to save customer information such as name, contact information, and payment or credit card information. The transaction history log may also save a reference, a pointer, or other identifier indicating the location in the transaction history log of the entry for the authorization request. Information already contained in the authorization request log entry may be omitted from the void request log entry as redundant.

It will be apparent to one of skill in the art how to add a payment processor 580 to the above method of voiding a transaction. The bar code for the digital product could be rescanned at the register, and the credit card could be swiped again at the credit card terminal. The payment processor 580 would submit a void request to the digital activation hub 110, as it did with the authorization request of method 600, but use the input parameters required for a void request. The payment processor 580 would then be able to submit a request to reverse payment directly to the processing company 590 once the digital activation broker 114 informed it that the void was successful. The payment processor 580 could also facilitate printing the results of the void request and instructions on additional potential customer actions directly onto the receipt through communication with the register or credit card terminal. The payment processor 580 could also include on the receipt the results of the reverse payment request to the processing company 590.

Authorization Code Lookup by Digital Activation Broker

Customers 140 may sometimes lose their authorization code, or an authorization code generated by the authorization code provider 150 may fail to reach the customer 140. For example, a response message may come back garbled or incomplete, or otherwise have an authorization code that is unreadable. The customer 140, the POT system 130, or the digital activation broker 114 may then wish to perform an authorization code lookup. In some embodiments, the lookup request may be performed automatically when there is a problem with a response message. An authorization code lookup may also be used to confirm that an authorization code is valid and active before performing a void request or to confirm that a void was successful. In some embodiments, the digital activation broker 114 or authorization code provider 150 may not verify that a void request is valid and may instead require that any void requests be preceded by a lookup request.

Figure 8:
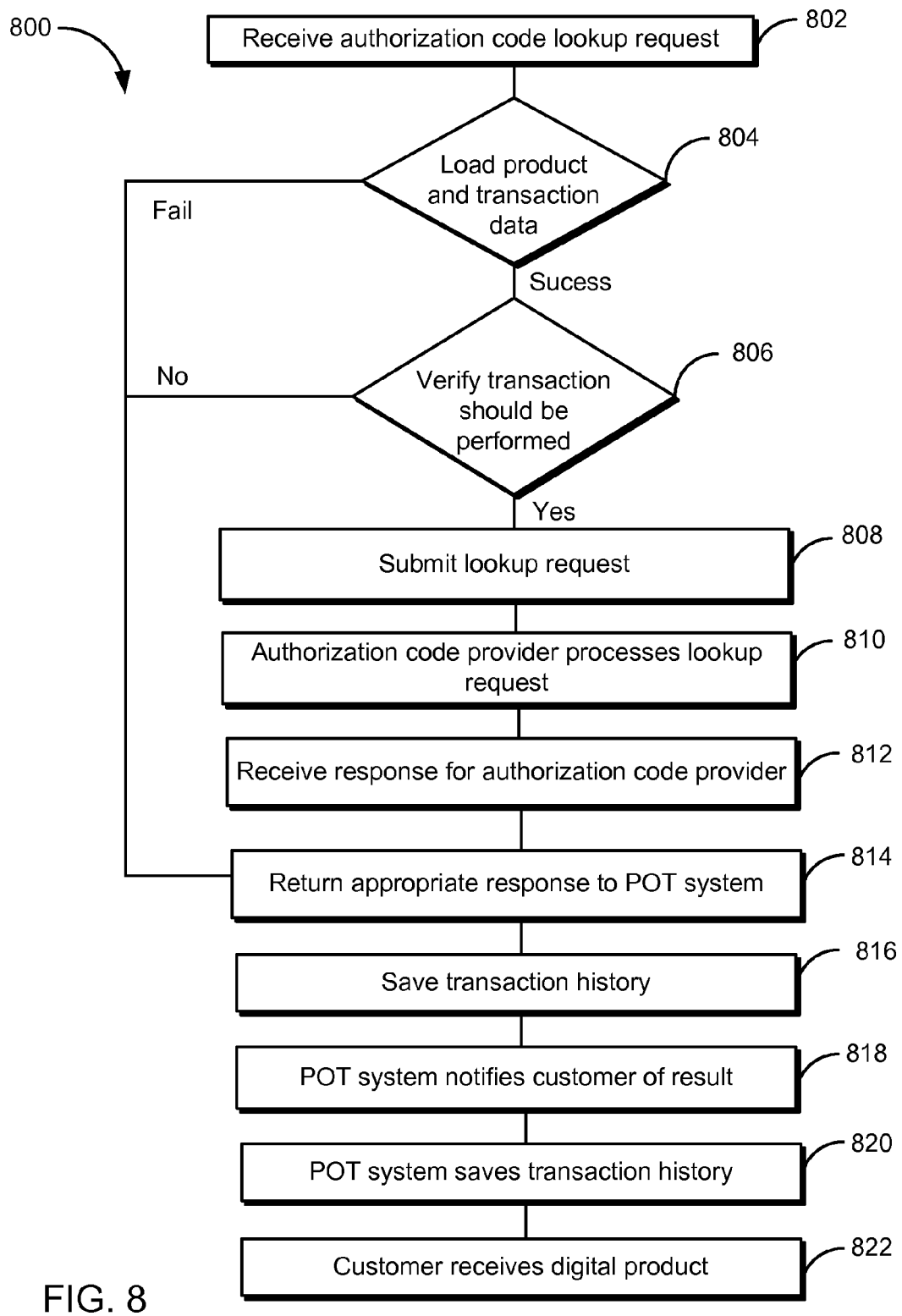
FIG. 8 is a flow chart of a method of looking up an authorization code for an already purchased digital product.

FIG. 8 shows a method 800 by the digital activation broker 114 of handling an authorization code lookup request. The method 800 is disclosed for a system 100 without a payment processor 580, but one of skill in the art will recognize how to adapt it for a system 600 with a payment processor 580. The digital activation broker 114 receives 802 an authorization code lookup request from the POT system 130. In some embodiments, if the request is initiated by a customer 140, the customer 140 may be required to show one or more ID documents, such as a driver's license, and have information from those documents recorded.

The POT system 130 provides a product identifier, such as the unique ID, UPC, or ISBN, and a transaction ID to the digital activation broker 114. In some embodiments, the POT system 130 may provide the POT location and the POT transaction ID to identify the transaction. In other embodiments, the POT system 130 may have stored the provider transaction ID or the date and time and may submit that information to the digital activation broker 114. As discussed previously, the POT system 130 may also submit login information and application information as part of the lookup request. The digital activation broker 114 may be able to accept differently formatted requests from different POT systems 130.

The digital activation broker 114 loads 804 the product and transaction data based on the product identifier and transaction identifier received from the POT system 130. The product data may be loaded from the master digital catalog 112 or product data saved in memory. Alternatively or additionally, the product data and transaction data may be loaded from the transaction history log. The product data may include the unique ID, UPC, ISBN, content provider, content provider code, sale end date, expiration date, authorization code, activation URL, and/or fulfillment URL. The transaction data may include the POT location, POT transaction ID, provider transaction ID, and/or time and date. The load command may fail when, for example, the digital activation broker 114 does not find product data or transaction data for the product identifier or the transaction identifier supplied by the POT system 130. If the load command fails, the digital activation broker 114 may immediately jump to step 814.

If the data is loaded successfully, the digital activation broker verifies 806 that the transaction should be performed. The digital activation broker 114 may save a time limit for authorization code lookups, or lookup requests may not be allowed for some transactions. Alternatively, the transaction history log may reflect that the transaction has been voided or that the authorization has failed. A particular POT system 130 may be flagged for suspicious activity, and the digital activation broker 114 will request human approval before processing the lookup request or will automatically decline the lookup request. In some embodiments, the digital activation broker 114 may confirm the login information is correct at this step. In other embodiments, the login information will be verified before the product data and transaction data are loaded. If the verification fails, the digital activation broker immediately jumps to step 814. In some embodiments, the digital activation broker 114 has saved the authorization code and can immediately jump to step 814 if it has verified that it may return the authorization code. In those embodiments where the digital activation broker 114 does not save the authorization code or has not saved the authorization code because it does not have permission, the digital activation broker 114 proceeds to step 808.

Next, the digital activation broker 114 uses the activation URL to submit 808 a lookup request to the authorization code provider 150. The request may include a transaction identifier and a product identifier. Some authorization code providers 150 may only require that a transaction identifier be supplied. The transaction identifier may be the provider transaction ID. The POT location, POT transaction identifier, and date and time are also possible transaction identifiers. The product identifier may be a unique ID, UPC, ISBN, or similar identifier. The lookup request may also include login information and application information. In some embodiments, the digital activation broker 114 may submit differently formatted requests to different authorization code providers 150.

The authorization code provider 150 then processes 810 the lookup request. The authorization code provider 150 may confirm that the authorization code may be looked up. Some digital products may require the authorization code to be used only once to access the product. Any subsequent lookups may be considered fraudulent. Alternatively, some authorization code providers 150 may refuse to allow automatic authorization code lookups once the digital product has been accessed, downloaded, or printed a certain number of times. Some authorization code providers 150 may ask the fulfillment provider 160 whether the content is eligible for a lookup request. Some fulfillment providers 160 may automatically notify the authorization code provider 150 when the digital product is no longer eligible for a lookup request. Alternatively, there may be a date or lookup deadline after which the authorization code can no longer be looked up. The authorization code provider 150 may determine whether the lookup deadline has passed without contacting the fulfillment provider 160. The lookup request may also fail for other reasons: the authorization code provider 150 may not find the transaction or product to have been based on the transaction identifier or product identifier submitted; the login information may have been incorrect; the authorization transaction may not have been completed successfully; or the transaction may have been voided.

If the authorization code provider 150 determines that a lookup should be allowed, it determines the authorization code by looking it up, regenerating the authorization code, or generating a new authorization code. If a new authorization code is generated, the old authorization code may be placed on a bad key list. The authorization code provider 150 may also notify the fulfillment provider 160 that a new key has been generated. In other embodiments, the fulfillment provider 160 may stop allowing access with the old authorization code as soon as the authorization code provider 150 asks whether a lookup request is allowed. In those embodiments, the authorization code provider 150 may notify the fulfillment provider 160 if the lookup or key generation was unsuccessful, or it may ask the fulfillment provider 160 if the digital product is eligible to be looked up as the last step after generating a new key and before returning the new key.

The digital activation broker 114 then receives 812 a response from the authorization code provider 150. The response may contain different fields if the request was successful versus if it failed. In some embodiments, all responses may have the same fields with one of the fields indicating whether the request was successful. The response may be an object with variables for each possible field of the response. The objects or fields in the response may be the same as the response to the authorization and void requests, and the unused fields may be unpopulated. The responses may have fields identifying the transaction, such as the provider transaction ID, the POT transaction ID, the POT location, the unique ID, and/or another product identifier. Some authorization code providers may return a new provider transaction ID for the lookup request.

The response may also include a field indicating whether the digital product has been downloaded and a field with the date that the digital product was downloaded. Alternatively, the response may include one or more fields indicating whether the digital product was accessed, was downloaded, was printed, failed a void eligibility criteria, or failed another lookup eligibility criteria, and the date that event occurred. Additionally, the response may include a field indicating whether the digital product has been voided and a field for the date the digital product was voided. The response may also contain the failure type, the failure code, and a written description of the failure. In some embodiments, the failure code and failure description may indicate whether the lookup request failed the eligibility criteria and the date that the transaction no longer met the eligibility criteria. The failure type, failure code, and failure description may be included in addition to or instead of the fields indicating whether the digital product is no longer eligible for lookup or has been voided.

The digital activation broker 114 then returns 814 an appropriate response to the POT system 130. This response will also indicate whether the transaction was successful. In some cases, the response will indicate a failure because of a problem detected by the digital activation broker 114. In other cases, a failure will be indicated based on the response received from the authorization code provider 150. The digital activation broker 114 may return the response in a format preferred by the POT system 130. The POT system 130 may have different message formats for responses indicating success and responses indicating failure, or it may use the same format for either type of response and leave unused fields empty. If a single format is used, the response may include a field indicating whether the lookup request was successful. The POT system 130 may use the same response format for authorization code requests, void requests, and lookup requests with the unused fields left unpopulated.

The response may have fields with transaction identifying information including the POT location, the POT transaction ID, the unique ID, and/or other identifiers used by the POT system 130 to identify the product. In some embodiments, the original and/or new provider transaction ID may be returned to the POT system 130. For successful transactions, the response may include the authorization code, the fulfillment URL, and/or the encrypted content data. In some embodiments, the encrypted content data does not need to be resent, because it is sent to the POT system 130 by the master digital catalog 112, or it is assumed that the customer already has the encrypted content data. In those embodiments, the success response may contain only the authorization code or fulfillment URL. For some POT systems 130, the response may again include standard instructions on acquiring the digital product, which may be determined based on the content provider 120 or product in question. For other POT systems 130, the response may include an instruction code that the POT system 130 can use to lookup standard instructions.

If, for any reason, the lookup request was not successful, the digital activation broker 114 may return failure information. The failure information may include a failure type, a failure code, and a failure description. The failure codes may be any of the codes received by the digital activation broker 114 from the authorization code provider 150. In some embodiments, the failure codes may indicate whether the digital activation broker 114 or the authorization code provider 150 rejected the transaction. In other embodiments, the digital activation broker 114 may hide the authorization code provider 150 from the POT system 130 and use the digital activation broker's 114 own set of failure codes. For some POT systems 130, a failure response may include standard instructions on additional actions the customer may take if the customer 140 believes a lookup request should be allowed. These instructions may be determined based on the failure code, content provider 120, and/or product in question. The instructions may be part of the failure description. For other POT systems 130, the response may include an instruction code that the POT system 130 can use to look up standard instructions, or that the POT system 130 have standard instructions for each failure code.

The digital activation broker 114 may then save 816 the messages or their fields to the transaction history log. The saved information may include the date and time; transaction identifying information such as POT location, POT transaction ID, new or old provider transaction ID, and unique ID; whether the content is no longer eligible for voiding and the date it became ineligible; whether the content is no longer eligible for lookup requests and the date it became ineligible; whether the content was voided and the date it was voided; and the failure type, failure code, and failure description. If different failure codes were used by the digital activation broker 114 and authorization code provider 150, the transaction history may save one or both codes. In some embodiments, the transaction history log may also save a reference, a pointer, or other identifier indicating the location in the transaction history log of the entry for the authorization request and any void requests. Information already contained in the authorization request log entry or any void request log entries may be omitted from the lookup request log entry as redundant. The digital activation broker 114 may monitor lookup requests in the transaction history log to detect suspicious or unusual behavior.

The POT system 130 then notifies 818 the customer 140 of the result of the lookup request. The POT system 130 provides the customer with the fulfillment information necessary to receive the digital product if the request was successful. This may be the encrypted content data, the activation code, and/or the fulfillment URL. The POT system 130 may perform this step in any of the ways used in step 418, such as printing the authorization code and fulfillment URL on a receipt. If the lookup request failed, the POT system 130 may inform the customer 140 of why it failed and assist the customer 140 with taking additional action if the customer 140 believes a lookup request should be allowed. In some embodiments, the results of the lookup request, including the reason for any failure, are printed directly onto a receipt. If the lookup request failed, the receipt may also contain instructions on additional actions the customer 140 may take if the customer 140 believes a lookup request should be allowed.

The POT system 130 may also save 820 the transaction information into its own transaction history log. In addition to the information saved by the digital activation broker 114, the POT system 130 may wish to save customer information such as name, contact information, ID document information, and payment or credit card information. The transaction history log may also save a reference, a pointer, or other identifier indicating the location in the transaction history log of the entry for the authorization request and the entries for any void requests. Information already contained in the authorization request log entry or any void request log entries may be omitted from the lookup request log entry as redundant.

The customer 140 may then receive 822 and consume the digital product in any of the manners disclosed in step 422. A person of skill in the art will recognize many other ways of providing authorization codes to customers who have lost them. The lost authorization code could be provided to the customer 140 by the fulfillment provider 160 once the customer 140 has provided sufficient evidence of his or her right to access the digital product. Alternatively, the customer 140 may have registered with the fulfillment provider 160 such that it could mail or email the authorization code directly to the customer. In these embodiments, the fulfillment provider 160 may have saved the authorization code or may request the authorization code from the authorization code provider 150.

Those skilled in the art will recognize how to include a payment processor 580 in the lookup request method. The bar code for the digital product could be rescanned at the register and the credit card could be swiped again at the credit card terminal. Alternatively, a sales clerk could input information from the ID documents into the register. An authorization code provider 150 may require that the customer pay a lost authorization code fee to recover the authorization code. The payment processor 580 would then be able to request authorization for payment of the lost key fee from a processing company 590 before submitting the lookup request to the digital activation hub 110. The payment processor 580 would then submit a lookup request to the digital activation hub 110, as it did with the authorization request of method 600, but use the input parameters required for a lookup request. The payment processor 580 could also facilitate printing the results of the lookup request, including authorization code and fulfillment URL for successful transactions, and instructions on additional potential customer actions, directly onto the receipt through communication with the register or credit card terminal. The payment processor 580 could also include on the receipt the results of any request for payment authorization to a processing company 590 as well.

It will be obvious to those having skill in the art that many changes may be made to the details of the above-described embodiments without departing from the underlying principles of the invention. The scope of the present invention should, therefore, be determined only by the following claims.

The invention claimed is:

1. A method for transmitting digital media content data to a point-of-transaction (POT) system, the method comprising:
   loading product data for a plurality of digital products into a catalog database, wherein the product data comprises activation location data and fulfillment location data for each of the plurality of digital products, a plurality of different digital rights management (DRM) schemes are imposed on the plurality of digital products, the activation location data corresponds to an authorization code provider computing system, and fulfillment location data for the plurality of digital products correspond to two or more different fulfillment providers computing systems;
   assigning a unique ID to each digital product in the catalog database;
   decoding data received from a POT system describing an order for a digital product at a digital activation broker computing system, wherein the order comprises a unique ID for the ordered digital product;
   loading product data for the digital product into the digital activation broker computing system, wherein loading the product data for the digital product into the digital activation broker computing system comprises loading the product data from the catalog database;
   requesting, by the digital activation broker computing system, authorization credential data from a corresponding system, indicated by the activation location data via a computer network;
   wherein the digital activation broker computing system is configured to request authorization credential data from a plurality of authorization code provider computing systems;
   receiving at the digital activation broker computing system the authorization credential data from the plurality of authorization code provider computing systems, wherein the credential data is formatted according to one of the plurality of different DRM schemes; and
   returning the authorization credential data and fulfillment location data corresponding to the digital product from the digital activation broker computing system to the POT system via the computer network in response to the order.

2. The method of claim 1, further comprising:
   determining that a portion of the product data should be distributed;
   selecting a plurality of POT systems to receive the portion of the product data; and
   distributing the portion of the product data to the selected POT systems.

3. The method of claim 1, further comprising saving transaction data from the order to a transaction history log.

4. The method of claim 3, wherein the transaction data comprises at least one of the authorization credential data, the activation location data, and the fulfillment location data.

5. The method of claim 1, further comprising:
   receiving from the POT system a void request at the digital activation broker computing system corresponding to the order;
   submitting a request to void the order to the corresponding system indicated by the activation location data; and
   returning a response to the void request, wherein the response comprises an indication of whether the order was successfully voided.

6. The method of claim 5, wherein the void request is unsuccessful and the response further comprises a failure code.

7. The method of claim 1, further comprising:
   receiving from the POT system a lookup request at the digital activation broker computing system corresponding to the order;
   requesting the authorization credential from the corresponding system indicated by the activation location data; and
   returning a response to the lookup request, wherein the response comprises an indication of whether the lookup request was successful.

8. The method of claim 7, wherein the lookup request is successful and the response further comprises the authorization credential data.

9. The method of claim 7, wherein the lookup request is unsuccessful and the response further comprises a failure code.

10. The method of claim 1, wherein the POT system delivers the authorization credential data and the fulfillment location data to the customer.

11. The method of claim 10, wherein the POT system prints the authorization credential data and the fulfillment location data on a receipt.

12. The method of claim 1, wherein the order is received from the POT system via a payment processor, and wherein the payment processor requests payment authorization from a processing company.

13. The method of claim 12, wherein the payment processor prints the authorization credential data and the fulfillment location data on a receipt.

14. A digital rights management (DRM) system for managing digital rights retrieved from an Internet computer network to enable distribution of digital media content data to a plurality of point-of-transaction (POT) systems, the DRM system including a local computer, a digital activation broker system communicatively coupled to the local computer, a plurality of authorization code servers, a plurality of fulfillment provider servers, and a plurality of DRM schemes comprising:
the local computer:
receiving from a first POT system a first order for a first digital product protected according to a first DRM scheme;
receiving from a second POT system a second order for a second digital product protected according to a second DRM scheme different from the first DRM scheme;
loading first product data for the first digital product into the digital activation broker system, wherein the first product data comprises first activation location data corresponding to a first authorization code server and first fulfillment location data corresponding to a first fulfillment provider server;
loading second product data for the second digital product into the digital activation broker system, wherein the second product data comprises second activation location data corresponding to a second authorization code provider server and second fulfillment location data corresponding to a second fulfillment provider server, the second fulfillment provider server different from the first fulfillment provider server;
requesting, by the digital activation broker system, a first authorization credential from a first system indicated by the first activation location data via the Internet;
requesting, by the digital activation broker system, a second authorization credential from a second system indicated by the second activation location data via the Internet; wherein the digital activation broker system is configured to request authorization credential data from a plurality of authorization code provider servers;
receiving at the digital activation broker system the first authorization credential from the first authorization code provider server; and
receiving at the digital activation broker system the second authorization credential from the second authorization code provider server
wherein the first authorization credential and the second authorization credential are formatted according to a different one of the plurality of different DRM schemes;
returning the first authorization credential and the first fulfillment location data from the digital activation broker system to the first POT system via the Internet in response to the first order; and
returning the second authorization credential and the second fulfillment location data from the digital activation broker system to the second POT system via the Internet in response to the second order.

15. The computer system of claim 14, wherein the local computer further comprises a Master Digital Catalog of:
product data for a plurality of digital products into the Master Digital Catalog; and
a unique ID for each digital product.

16. The DRM system of claim 14, wherein the the digital activation system broker saves transaction data from the order to a transaction history log.

17. The DRM system of claim 16, wherein the transaction data comprises at least one of the authorization credential data, the activation location data, and the fulfillment location data.

18. The DRM system of claim 14, wherein the the digital activation broker system:
receives from a POT system a void request at the digital activation broker system corresponding to the order;
submits a request to void the order to a system indicated by the activation location data; and
returns a response to the void request, wherein the response comprises an indication of whether the order was successfully voided.

19. The DRM system of claim 18, wherein the void request is unsuccessful and the response further comprises a failure code.

20. The DRM system of claim 14, wherein the digital activation broker system is enabled to:
receive from the first POT system a lookup request at the digital activation broker system corresponding to the first order;
request the first authorization credential from a system indicated by the first activation location data; and
return a response to the lookup request, wherein the response comprises an indication of whether the lookup request was successful.

21. The DRM system of claim 14, wherein the second authorization code provider computing system is different from the first authorization code provider computing system.

22. A non-transitory computer readable storage medium having stored thereon computer-readable instruction code for a computer system to perform a method of distributing digital media content data to a point-of-transaction (POT) system, the method comprising:
receiving from a first POT system a first order for a first digital product at a digital activation broker system on a computer system, the first digital product protected according to a first digital rights management (DRM) scheme;
receiving from a second POT system a second order for a second digital product at the digital activation broker system, wherein the second POT system is different from the first POT system and the second digital product is protected according to a second DRM scheme different from the first DRM scheme;
loading first product data for the first digital product into the digital activation broker system, wherein the first product data comprises first activation location data corresponding to a first authorization code provider computing system and first fulfillment location data corresponding to a first fulfillment provider computing system;
loading second product data for the second digital product into the digital activation broker system, wherein the second product data comprises second activation location data corresponding to a second authorization code provider computing system and second fulfillment location data corresponding to a second fulfillment provider computing system, the second fulfillment provider computing system different from the first fulfillment provider computing system;

requesting, by the digital activation broker system, a first authorization credential from a first system indicated by the first activation location data via a computer network;

requesting, by the digital activation broker system, a second authorization credential from a second system indicated by the second activation location data via the computer network, wherein the digital activation broker computing system is configured to request authorization credential data from a plurality of authorization code provider computing systems;

receiving at the digital activation broker system the first authorization credential from the first authorization code provider computing system;

receiving at the digital activation broker system the second authorization credential from the second authorization code provider computing system, wherein the first authorization credential and the second authorization credential are formatted according to a different one of the plurality of different DRM schemes;

returning the first authorization credential and the first fulfillment location data from the digital activation broker to the first POT system via the computer network in response to the first order;

returning the second authorization credential and the second fulfillment location data from the digital activation broker to the second POT system via the computer network in response to the second order;

saving transaction data from the first order and the second order to a transaction history log;

receiving from the first POT system a void request at the digital activation broker system corresponding to the first order;

submitting a request to void the first order to the first system indicated by the first activation location data; and returning a response to the void request, wherein the response comprises an indication of whether the first order was successfully voided.

* * * * *